H. J. FROST.
SELF PILING REEL.
APPLICATION FILED JUNE 26, 1914.

1,140,810.

Patented May 25, 1915.

Witnesses:

Inventor:
Herbert J. Frost
By his Att'y

UNITED STATES PATENT OFFICE.

HERBERT J. FROST, OF NEW YORK, N. Y.

SELF-PILING REEL.

1,140,810. Specification of Letters Patent. Patented May 25, 1915.

Application filed June 26, 1914. Serial No. 847,363.

*To all whom it may concern:*

Be it known that I, HERBERT J. FROST, a citizen of the United States, residing in New York city, in the county of New York and State of New York, have invented certain new and useful Improvements in Self-Piling Reels, of which the following is a specification.

This invention relates to line pilers having means for guiding a line while it is being wound up or unwound from a drum, and more particularly to means for guiding a line to pile itself evenly on a fishing reel through the directional tension of the line.

For a successfully operating self piler for reels, it is necessary that the movable member be responsive to every tendency of direction the line may take. Since such line pilers come in direct contact with the wet fishing line, rust may collect quickly on some of the metal parts, and the wooden parts, if any, become quickly warped. Furthermore, the wet line itself adds to the difficulty of the proper operation of the device. For this reason, it has been found that the self pilers heretofore used quickly became out of order and interfered with, rather than assisted in, the piling of the line, especially if such reel pilers comprised many working surfaces and a plurality of constituent parts.

In view of the foregoing, among the main objects of this invention, it is aimed to provide an attachment that is composed of the fewest possible parts, viz: two parts, a rail member and a movable member; to provide an attachment in which the movable member has the fewest working surfaces possible, viz: the sliding surfaces and line engaging surface; and to provide an attachment in which the surface engaging the line and sliding surfaces are smooth polished surfaces that are immune to distortion or defacement from the action of water, such as by the collection of rust, warping or the like, to which end a movable member of a vitreous nature is provided or one having moisture resistant quantities and having highly polished surfaces, or may be composed of any friction reducing material that is water-proof and is susceptible of taking on a high polish. In this class may be included various precious and semi-precious stones such as agate, jaspar, etc.

Other objects of the invention are to provide a device of the class defined that is simple of construction, cheap to manufacture, and adapted to be attached to standard fishing reels.

Figure 1:
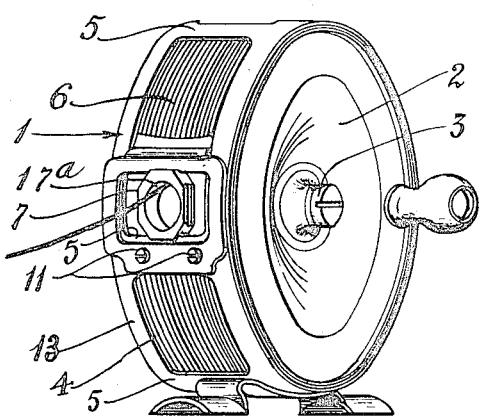
Figure 2:
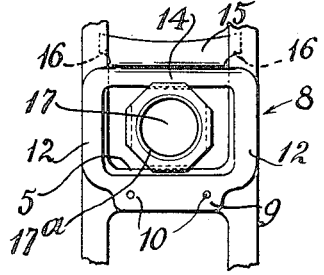
Figure 5:
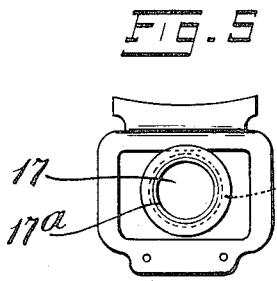
Figure 3:
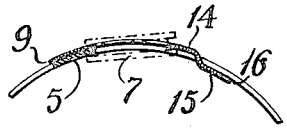
Figure 4:
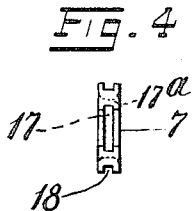

These and other features, capabilities and advantages of the invention will appear from the detailed description of the specific embodiments of the invention illustrated in the accompanying drawing, in which:

Figure 1 is a perspective showing the attachment on a standard fishing reel. Fig. 2 is a detached side elevation of the attachment. Fig. 3 is an end elevation of the attachment. Fig. 4 is an end elevation of the movable member; and Fig. 5 is a detached side elevational view of a modified form of attachment.

In the embodiment shown in Fig. 1 a standard reel is provided having a stationary member 1 and a rotatable disk member 2 mounted to rotate on the shaft 3 secured centrally of the stantionary member 1. The stationary member 1 is provided with a peripheral skeleton frame 4 having cross members 5 which are in alinement with the shaft 3. The shaft 3 is shown as having a fishing line 6 wound thereon.

The line piling attachment is composed of a rail member adapted to be secured parallel to one of the cross members 5 and so spaced from such cross member 5 as to accommodate between it and the member 5 the movable member or eyelet 7. As illustrated in Fig. 2, the line piling attachment is composed of a metal plate 8, having a rectangular opening, at one end of which is provided the plate securing member 9 having screw openings 10 which are adapted to register with corresponding screw openings in the cross member 5, to which the attachment is to be secured so as to accommodate screws 11. Extending from said securing member 9, and at right angles thereto, are two curved side members 12 which rest against the exteriors of the annular side members 13 of the peripheral frame 4 and terminate in a rail member 14 which is preferably deflected inward at its end 15 and provided with lateral extensions 16 from the deflected portion 15, which lateral extensions 16 project under the annular side members 13 to assist in securing the attachment in position.

The inner edge of the rail member 14 is spaced apart from the inner edge of the securing member 9 such a distance that when the plate 8 is secured in position the inner edge of the rail member 14 will be removed from the oppositely facing edge of the cross member 5 a distance to accommodate between them the movable member or eyelet 7.

The movable member 7 is composed of a highly polished material such as mother of pearl, and has a bored opening 17 therein, the peripheral edge 17a of which is convexed, the line 6 passing through the said opening 17 in the operation of the device. The outer edge of the eyelet 7, illustrated in Fig. 2, is preferably polygonal in form, every other side of which is provided with a peripheral groove 18, two diagonally opposite grooves engaging the oppositely facing edges of the rail member 14 and the cross member 5, respectively. Obviously, all the sides may be provided with such grooves when in working position.

In the modification illustrated in Fig. 5, the outer periphery of the movable member or eyelet 7 is round instead of angular and is provided with an annular peripheral groove 19, the diagonally opposite portions of which engage the opposite edges of the rail member 14 and cross member 5, respectively. It is obvious that various changes and modifications in the details of construction may be made without departing from the spirit of the invention.

I claim:

1. In a fishing reel, the combination with the parallel peripheral cross members of the stationary member of such reel, of an attachment to be secured to the periphery of said reel, said attachment having a rail member extending parallel to one of said peripheral cross members, and a movable line guide mounted to slide between said rail member and the peripheral cross member parallel thereto.

2. In a fishing reel, the combination with the parallel peripheral cross members of the stationary member of such reel, of an attachment to be secured to the periphery of said reel, said attachment having a rail member extending parallel to one of said peripheral cross members, and a glazed movable line guide mounted to slide between said rail member and the peripheral cross member parallel thereto.

3. In a fishing reel, the combination with the parallel peripheral cross members of the stationary member of such reel, of an attachment to be secured to the periphery of said reel, said attachment having a rail member extending parallel to one of said peripheral cross members, and a movable line guide of shell formation mounted to slide between said rail member and the peripheral cross member parallel thereto, said guide having a peripheral groove into which said rail member and said peripheral cross member engage.

4. In a fishing reel, the combination with the parallel peripheral cross members of the stationary member of such reel; of an attachment to be secured to the periphery of said reel, said attachment comprising a plate having a securing plate portion to be secured to one of said cross members, two lateral plate portions extending from said securing portion, and a rail portion; and a movable line guide, the rail portion being spaced apart from one of said cross members just sufficient to slidably accommodate said guide between them.

5. In a fishing reel, the combination with the stationary member of said reel having the parallel peripheral cross members extending axially of said reel, and annular side members; of an attachment to be secured to the periphery of said reel, said attachment comprising a plate having a securing portion to be secured to one of said cross members, two lateral curved plate portions extending from said securing portion and lying along the annular side members, and a rail portion; and a movable line guide, the rail portion being spaced apart from one of said cross members just sufficient to slidably accommodate said guide between them, the end of said rail portion being deflected inward and having lateral extensions to project under said annular side members to assist in firmly positioning said attachment on said reel.

6. In a fishing reel, the combination with the parallel peripheral cross members of the stationary member of such reel; of an attachment to be secured to the periphery of said reel, said attachment comprising a single plate having a securing plate portion to be secured to one of said cross members and having screw openings, the cross member to which said plate portion is secured having corresponding screw openings, screws to engage said screw openings to secure said plate to said cross member, said plate also having two lateral plate portions extending from said securing portion, and a rail portion; and a movable line guide, the rail portion being spaced apart from said cross member to which the plate is secured just sufficient to slidably accommodate said line guide between them.

7. A two-piece piling reel attachment for a reel having a peripheral cross member, said attachment having a rail member to be secured to the periphery of the reel, and a movable line guide to be slidably secured between said rail member and peripheral cross member.

HERBERT J. FROST.

Witnesses:
R. H. Owen,
R. T. Donnell.